United States Patent
Ying et al.

(10) Patent No.: US 11,860,293 B2
(45) Date of Patent: Jan. 2, 2024

(54) RADAR PROBING EMPLOYING PILOT SIGNALS

(71) Applicant: Sony Group Corporation, Tokyo (JP)

(72) Inventors: Zhinong Ying, Lund (SE); Thomas Bolin, Lund (SE); Peter C. Karlsson, Lund (SE); Erik Bengtsson, Eslov (SE)

(73) Assignee: Sony Group Corporation, Tokyo (JP)

(*) Notice: Subject to any disclaimer, the term of this patent is extended or adjusted under 35 U.S.C. 154(b) by 151 days.

(21) Appl. No.: 16/305,921

(22) PCT Filed: Jun. 1, 2016

(86) PCT No.: PCT/EP2016/062338
§ 371 (c)(1),
(2) Date: Nov. 30, 2018

(87) PCT Pub. No.: WO2017/207041
PCT Pub. Date: Dec. 7, 2017

(65) Prior Publication Data
US 2020/0333456 A1    Oct. 22, 2020

(51) Int. Cl.
*G01S 7/02* (2006.01)
*G01S 7/00* (2006.01)
*G01S 13/86* (2006.01)

(52) U.S. Cl.
CPC .............. *G01S 7/023* (2013.01); *G01S 7/006* (2013.01); *G01S 13/86* (2013.01)

(58) Field of Classification Search
CPC ................................ G01S 13/86; G01S 7/006
USPC .......................................................... 342/52
See application file for complete search history.

(56) References Cited

U.S. PATENT DOCUMENTS

| | | | | |
|---|---|---|---|---|
| 3,798,552 A | * | 3/1974 | Pratt ......................... | H03J 7/04 455/75 |
| 2007/0096885 A1 | * | 5/2007 | Cheng ................... | B60W 40/04 340/463 |
| 2008/0204322 A1 | * | 8/2008 | Oswald ..................... | G01S 5/04 342/465 |
| 2009/0045997 A1 | | 2/2009 | Meyers | |
| 2010/0202379 A1 | * | 8/2010 | Luo ........................ | H04W 16/06 370/329 |
| 2010/0330999 A1 | * | 12/2010 | Larsson ................ | H04W 36/08 455/439 |
| 2011/0140949 A1 | * | 6/2011 | Lee ....................... | H01Q 21/061 342/107 |
| 2012/0094594 A1 | | 4/2012 | Rofougaran | |
| 2012/0114026 A1 | * | 5/2012 | Nguyen .................. | G01S 7/006 375/220 |
| 2012/0143397 A1 | * | 6/2012 | Mackay ................ | G01S 5/0027 701/1 |

(Continued)

FOREIGN PATENT DOCUMENTS

| | | | | |
|---|---|---|---|---|
| CN | 103760519 A | * | 4/2014 | ............. G01S 13/42 |
| CN | 104471624 A | | 3/2015 | |

(Continued)

OTHER PUBLICATIONS

International Search Report and Written Opinion from counterpart International Patent Application No. PCT/EP2016/062338 dated Feb. 21, 2017, 11 pages.

*Primary Examiner* — Peter M Bythrow
(74) *Attorney, Agent, or Firm* — Tucker Ellis LLP (57) ABSTRACT

A device (112, 130) is configured to communicate data (108) on a radio channel (101, 105, 106) according to a radio access technology. The radio access technology comprises pilot signals and transmission blocks for the data (108). The device (112, 130) is further configured to participate in the radar probing (109) employing at least some of the pilot signals as radar probe pulses of the radar probing (109).

20 Claims, 8 Drawing Sheets

(56) References Cited

U.S. PATENT DOCUMENTS

| | | | |
|---|---|---|---|
| 2013/0281024 A1* | 10/2013 | Rofougaran | H04B 7/15507 455/63.1 |
| 2014/0035774 A1* | 2/2014 | Khlifi | G01S 7/006 342/21 |
| 2015/0098437 A1* | 4/2015 | Chen | H04L 5/0044 370/330 |
| 2015/0378004 A1 | 12/2015 | Wilson-Langman | |
| 2016/0223643 A1* | 8/2016 | Li | G01S 7/0236 |
| 2016/0277941 A1* | 9/2016 | Kim | G01S 7/003 |
| 2017/0026847 A1* | 1/2017 | Farshchian | G01S 7/021 |
| 2017/0307733 A1* | 10/2017 | Stainvas Olshansky | G01S 13/87 |
| 2017/0310758 A1* | 10/2017 | Davis | G01S 13/878 |
| 2018/0241822 A1* | 8/2018 | Davis | H04L 67/12 |
| 2019/0268117 A1* | 8/2019 | Nilsson | H04W 16/28 |
| 2020/0153907 A1* | 5/2020 | Davis | G01S 13/0209 |

FOREIGN PATENT DOCUMENTS

| | | | | |
|---|---|---|---|---|
| CN | 105612713 A | | 5/2016 | |
| GB | 2428921 A | | 2/2007 | |
| GB | 2428921 A | * | 2/2007 | ............. G01S 13/86 |
| WO | WO-2009007217 A1 | * | 1/2009 | ............ H04W 88/06 |
| WO | 2012037680 A1 | | 3/2012 | |
| WO | WO-2012037680 A1 | * | 3/2012 | ............. G01S 13/34 |
| WO | 2014125447 A1 | | 8/2014 | |
| WO | WO-2014125447 A1 | * | 8/2014 | ........... G01S 13/003 |

* cited by examiner

RADAR PROBING EMPLOYING PILOT SIGNALS

TECHNICAL FIELD

Various examples relate to a device comprising a radio transceiver and at least one processor configured to communicate data on a radio channel. The at least one processor is further configured to control the radio transceiver to participate in a radar probing employing at least some pilot signals as radar probe pulses of the radio probing. Further examples relate to a corresponding method.

BACKGROUND

For achieving higher data bandwidth, spectra used for communication on radio channels are expected to move to higher frequencies, e.g., to frequencies beyond 6 or 10 GHz.

At such frequencies, radar probing is feasible. This is due to the well-defined spatial transmission characteristics of electromagnetic waves in the respective spectrum.

However, with data communication and radar probing coexisting in the same spectrum, interference can reduce a transmission reliability of the data communication and/or an accuracy of the radar probing.

SUMMARY

Therefore, a need exists for advanced techniques of coexistence of data communication and radar probing. In particular, a need exists for techniques which mitigate interference between data communication and radar probing.

This need is met by the features of the independent claims. The features of the dependent claims define embodiments.

In an example, a device comprises a radio transceiver and at least one processor. The at least one processor is configured to communicate, via the radio transceiver, data on a radio channel according to a radio access technology. The radio access technology comprises pilot signals and transmission blocks for the data. The at least one processor is configured to control the radio transceiver to participate in a radar probing employing at least some of the pilot signals as radar probe pulses of the radar probing.

In a further example, a method comprises communicating data on a radio channel according to a radio access technology. The radio access technology comprises pilot signals and transmission blocks for the data. The method further comprises participating in a radar probing employing at least some of the pilot signals as radar probe pulses of the radar probing.

According to an example, a computer program product is provided which comprises control instructions that can be executed by at least one processor. Executing the control instructions causes the at least one processor to perform a method. The method comprises communicating data on a radio channel according to a radio access technology. The radio access technology comprises pilot signals and transmission blocks for the data. The method further comprises participating in a radar probing employing at least some of the pilot signals as radar probe pulses of the radar probing.

The examples described above and the examples described hereinafter may be combined with each other and further examples.

DETAILED DESCRIPTION OF PREFERRED EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of coexistence of data communication and radar probing on a radio channel are described. To facilitate the coexistence, pilot signals of a radio access technology employed for the data communication are re-used as radar probe pulses for the radar probing. The pilot signals—sometimes also referred to as reference signals or sounding signals—may have well-defined spatial, temporal, and frequency transmit characteristics. Generally, the pilot signals may have well-defined transmit properties, such as waveform, amplitude, phase, etc. Conventionally, the pilot signals are employed for performing at least one of channel sensing and link adaptation. This typically helps to maintain or optimize the data communication. Additionally, such properties of the pilot signals as outlined above facilitate application of the pilot signals as radar probe pulses when participating in the radar probing.

To implement such well-defined characteristics of the pilot signals, in some examples, one or more resource mappings may be employed to coordinate resource-usage of the data communication and the radar probing. The one or more resource mappings may define resource elements with respect to one or more of the following: frequency dimension; time dimension; spatial dimension; and code dimension. Sometimes, the resource elements are also referred to as resource blocks. Resource elements may thus have a well-defined duration in time domain and/or bandwidth in frequency domain. The resource elements may be, alternatively or additionally, defined with respect to a certain coding and/or modulation scheme. A given resource mapping may be defined with respect to a certain spatial application area or cell. Some of the resource elements may comprise one or more pilot signals. Other resource elements may relate to transmission blocks for the data.

In some examples, different types of pilot signals may exist. E.g., there may be UL pilot signals and/or DL pilot signals. Some types of pilot signals may be used to tailor resource allocation while other types of pilot signals may be used to determine beamforming antenna weights. In some examples, all different types of pilot signals are re-used as radar probe pulses. In other examples, only some of the types of pilot signals are re-used as radar probe pulses. Generally, it is not required that all available pilot signals are re-used as radar probe pulses.

By re-using the pilot signals for the radar probing, the radar probing can be implemented with no or little overhead. Data throughput of the data communication is not significantly reduced. At the same time, interference between the radar probing and the data communication can be effectively mitigated, because the pilot signals can preserve their function of enabling at least one of channel sensing and link adaptation of the radio channel—while offering extended functionality in form of the radar probing. Transmission blocks including data are typically suffering from strong interference, because they can be orthogonal to the resource elements comprising the pilot signals.

By employing the radar probing in the context of a device configured for data communication, functionality of that device can be greatly enhanced. Examples include: positioning aid, traffic detection, drone landing assistance, obstacle detection, security detection, photography features, etc.

Figure 1:
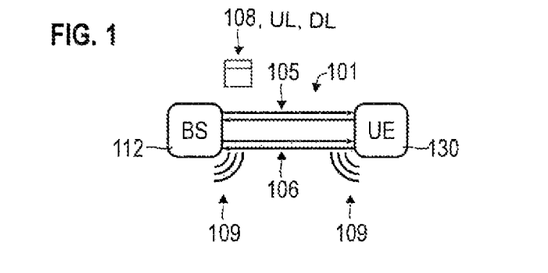
FIG. 1 schematically illustrates coexistence of data communication and radar probing according to various embodiments.

Now referring to FIG. 1, an example scenario of coexistence between radar probing 109 and data communication 108—such as packetized data communication—is depicted. Here, the base station (BS) 112 of a cellular network (in FIG. 1, the cells of the cellular network are not illustrated) implements the data communication 108 with the terminal (UE) 130 attached to the cellular network via a radio channel 101. Communicating data may comprise transmitting data and/or receiving data. In the example of FIG. 1, the data communication 108 is illustrated as bidirectional, i.e. comprising uplink (UL) communication and downlink (DL) communication.

E.g., the terminal 130 may be selected from the group comprising: handheld device; smartphone; laptop; drone; tablet computer; etc.

The data communication 108 may be defined with respect to a radio access technology (RAT). The RAT may comprise a transmission protocol stack in layer structure. E.g., the transmission protocol stack may comprise a physical layer (Layer 1), a data link layer (Layer 2), etc. Here, a set of rules may be defined with respect to the various layers which rules facilitate the data communication. E.g., the Layer 1 may define transmission blocks for the data communication 108 and pilot signals.

While with respect to FIG. 1 and the following FIGS., various examples are provided with respect to a cellular network where handovers are supported between a plurality of cells, in other examples, respective techniques may be readily applied to non-cellular point-to-point networks. Examples of cellular networks include the Third Generation Partnership Project (3GPP)—defined networks such as 3G, 4G and upcoming 5G. Examples of point-to-point networks include Institute of Electrical and Electronics Engineers (IEEE)—defined networks such as the 802.11x Wi-Fi protocol or the Bluetooth protocol. As can be seen, various RATs can be employed according to various examples.

The data communication 108 is supported by, both, the BS 112, as well as the terminal 130. The data communication 108 employs a shared channel 105 implemented on the radio channel 101. The shared channel 106 comprises an UL shared channel and a DL shared channel. The data communication 108 may be used in order to perform uplink and/or downlink communication of application-layer user data between the BS 112 and the terminal 130.

As illustrated in FIG. 1, furthermore, a control channel 106 is implemented on the radio channel 101. Also, the control channel 106 is bidirectional and comprises an UL control channel and a DL control channel. The control channel 106 can be employed to implement communication of control messages. E.g., the control messages can allow to set up transmission properties of the radio channel 101.

Both, performance of the shared channel 105, as well as performance of the control channel 106 are monitored based on pilot signals. The pilot signals, sometimes also referred to as reference signals or sounding signals, can be used in order to determine the transmission characteristics of the radio channel 101. In detail, the pilot signals can be employed in order to perform at least one of channel sensing and link adaptation.

Channel sensing can enable determining the transmission characteristics such as likelihood of data loss, bit error rate, multipath errors, etc. of the radio channel 101. Link adaptation can comprise setting transmission properties of the radio channel 101 such as modulation scheme, bit loading, coding scheme, etc.

The radar probing 109 can be used in order to determine the position and/or velocity of passive objects in the vicinity of the BS 112 and/or the terminal 130. The radar probing 109 may involve the analysis of an echo from a transmitted radar probe pulse. Here, radial and/or tangential velocity may be determined. For this, one or more receive properties of echoes of the radar probe pulses can be employed as part of the radar probing. Echoes are typically not transmitted along a straight line, hereinafter referred to non line-of-sight (LOS) for sake of brevity, but affected by reflection at the surface of an object. The receive properties may be locally processed at the radar receiver; and/or may be provided to a further entity such as the radar transmitter for processing to yield the position and/or the velocity.

As illustrated in FIG. 1, also the radar probing 109 is supported by, both, the BS 112, as well as the terminal 130. Thus, data communication 108 and radar probing 109 coexists in the hardware of the BS 112 and the terminal 130.

In the example of FIG. 1, the terminal 130 is connected to the base station 112 and is associated with a given cell of the cellular network. Typically, the pilot signals communicated between the base station 112 and the terminal 130 for channel sensing and/or link adaptation of the channel 101 of the respective cell are orthogonal to a further pilot signals of a further cell and/or include a respective cell identifier unique for the respective cell. It is possible that the radar probing 109 relies only on pilot signals associated with the respective cell to which the terminal 130 is connected. Alternatively or additionally, it is also possible that further pilot signals of neighboring or adjacent cells are taken into consideration as part of the radar probing.

Here, it is possible that the BS 112 implements the radar transmitter and/or the radar receiver. Likewise, it is possible that the terminal 130 implements the radar transmitter and/or the radar receiver. The radar transmitter is configured to transmit radar probe pulses. Likewise, the radar receiver is configured to receive echoes of radar probe pulses reflected from passive objects. In this regard, the pilot signals employed as radar probe pulses may comprise UL pilot signals and/or DL pilot signals.

In a first example, radar probe pulses are transmitted by the BS 112 and corresponding echoes are received by the BS 112. In a second example, radar probe pulses are transmitted by the BS 112 and corresponding echoes are received by the terminal 130. In a third example, radar probe pulses are transmitted by the terminal 130 and corresponding echoes are received by the terminal 130. In a fourth example, radar probe pulses are transmitted by the terminal 130 and corresponding echoes are received by the BS 112.

While with respect to FIG. 1 a two-device scenario is illustrated, in further examples, it is possible that more than two devices participate in the radar probing 109 as radar transmitters and/or radar receivers, respectively. E.g., further terminals connected to the cellular network (not shown in FIG. 1) may participate in the radar probing 109.

Generally, the techniques described herein may be implemented on the various devices of the network such as the BS 112 or one or more terminals 130 of the network.

Figure 2:
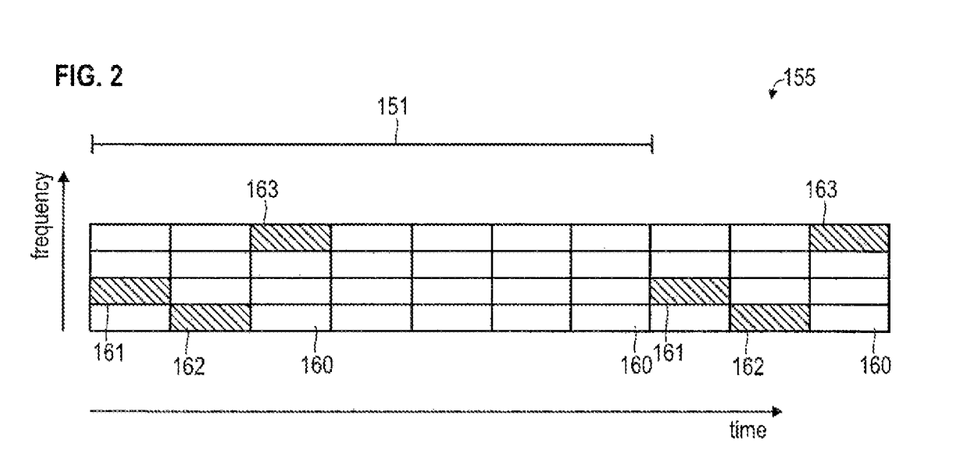
FIG. 2 schematically illustrates a resource mapping of a radio channel employed for the data communication according to various embodiments, the resource mapping comprising pilot signals and transmission blocks for the data.

FIG. 2 illustrates aspects with respect to the resource mapping 155. As illustrated in FIG. 2, the resource mapping 155 is defined in frequency domain (vertical axis in FIG. 2) and time domain (horizontal axis in FIG. 2). The rectangular blocks in FIG. 2 illustrates different resource elements. The resource elements 160 correspond to transmission blocks for the data communication 108. Differently, the resource elements 161-163—which are orthogonal to the resource elements 160—include pilot signals used as radar probe pulses for radar probing 109. The different resource elements 161-163 may correspond to different types of pilot signals.

It is also possible that the different resource elements 161-163 correspond to pilot signals associated with different cells. The resource elements 161-163 reserved for the pilot signals may be arranged in an intermittent sequence having a certain periodicity 151 (in FIG. 2 for sake of simplicity only a single repetition of the sequence of resource elements 161-163 is fully depicted). It is also possible that pilot signals are continuously transmitted.

In some examples, the resource mapping 155 may depend on the particular cell identification implemented by a corresponding BS 112. I.e., in order to mitigate inter-cell interference, it is possible that neighboring cells—or virtual cells—implement different resource mappings 155. Then, pilot signals in a first cell may be transmitted in resource elements 161-163 which are orthogonal with respect to the resource elements of a second cell neighboring to the first cell.

Generally, the techniques described herein are not limited to a particular spectrum or band. E.g., the spectrum occupied by the resource mapping 155 may be a licensed band or an unlicensed band. Typically, in an unlicensed band un-registered devices can gain access. Sometimes, in a licensed band a repository may keep track of all eligible subscribers; differently in an unlicensed band such a database of eligible subscribers may not exist. Different operators may access the unlicensed band. E.g., the spectrum occupied by the resource mapping 155 may be at least partially above 6 GHz, preferably at least partially above 15 GHz, more preferably at least partially above 30 GHz. Typically, with increasing frequencies, the aperature of an antenna decreases. Here, due to the well-defined directional transmission characteristics of the electromagnetic waves employed for the radar probing 109, a high spatial resolution may be achieved when determining the position of passive objects as part of the radar probing 109.

Figure 3:
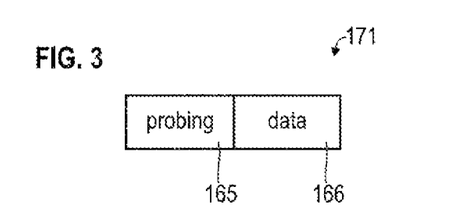
FIG. 3 schematically illustrates a pilot signals implementing radar probe pulse according to various embodiments.

FIG. 3 illustrates aspects with respect to a radar probe pulse 171 transmitted and/or received during one of the resource elements 161-163. The radar probe pulse 171 is implemented by a pilot signal. The radar probe pulse 171 comprises a probing pulse section 165. Optionally, the radar probe pulse 171 may comprise a data section 166 encoding data that can help to implement the radar probing 109.

E.g., the probing pulse section 165 may comprise a waveform having spectral contributions arranged within the frequency associated with the respective resource element 161-163. An amplitude of the waveform may be modulated; this is sometimes referred to as an envelope. The envelope may have a rectangular shape, a sinc-function shape, or any other functional dependency depending on the implementation. The duration of the probing pulse section 165 is sometimes referred to as pulse width. The pulse width may be shorter than the duration of the respective resource element 161-163 to enable reception of an echo of the radar probe pulse 171 during the duration of the respective resource element 161-163, taking into account time of travel.

In some examples, one or more symbols included in the probing pulse section 165 may be generated based on a generator code. Here, depending on the particular resource element 161-163 employed for the respective pilot signal/ radar probe pulse 171, the probing pulse section 165 may differ. Generally, different types of pilot signals/radar probe pulses 171 may employ different proving pulse sections 165.

The waveform of the probing pulse section 165 may have well-defined transmit properties. This facilitates channel sensing and/or link adaptation to be performed based on the received properties of the probing pulse section 165.

The optional data section 166 may include additional information which is suited to facilitate the radar probing 109. Such information may comprise: information on the radar transmitter, such as an identity; position; cell identity; virtual cell identity; etc.; and/or information on the radar probe pulse 171 itself such as a time of transmission; directional transmission profile; etc. Such information may be, generally, included explicitly or implicitly. E.g., for implicit inclusion of respective information, a lookup scheme communicated via the control channel 106 implemented on the radio channel 101 may be employed to enable inclusion of compressed flags.

While in the example of FIG. 3 such information is included in the data section 166 of the radar probe pulse 171 itself, in other examples it is also possible that such information is communicated separately from the radar probe pulse 171, e.g., in a control message communicated on the control channel 106 in one of the transmission blocks 160. Here, cross-reference between the control message and the radar probe pulse 171 may be achieved, e.g., a unique temporal arrangement of the radar probe pulse 171 and the control message or inclusion of a characteristic identifier in the control message and the radar probe pulse 171.

In some examples, additional information which is shown in the example of FIG. 3 to be included in the data section 166 may be pre-negotiated. E.g., depending on the particular resource element 161-163 employed for transmission of the respective pilot signal/radar probe pulse 171, the respective parameters may be known to the radar receiver and/or radar transmitter based on negotiated rules. Here, it may not be required to separately transmit this information.

In some examples, the different ones of the radar probe pulses 171 may be orthogonal with respect to each other. Here, orthogonality of the radar probe pulses 171 may be achieved by employing resource elements 161-163 for their transmission which differ from each other with respect to one or more of the following: frequency dimension; time dimension; spatial dimension; and code dimension. Sometimes, these cases are referred to frequency division duplexing (FDD), time division duplexing (TDD), spatial division duplexing; and code division duplexing (CDD). By employing orthogonal resource elements for different radar probe pulses 171, interference between separate instances of the radar probing 109 may be mitigated.

With reference to both FIGS. 2 and 3, in some examples, multiple resource elements 161-163 reserved for pilot signals are aligned such that they are adjacent in time domain and/or frequency domain. This allows to achieve a wider bandwidth for radar probing 109. A better accuracy can be achieved.

Figure 4:
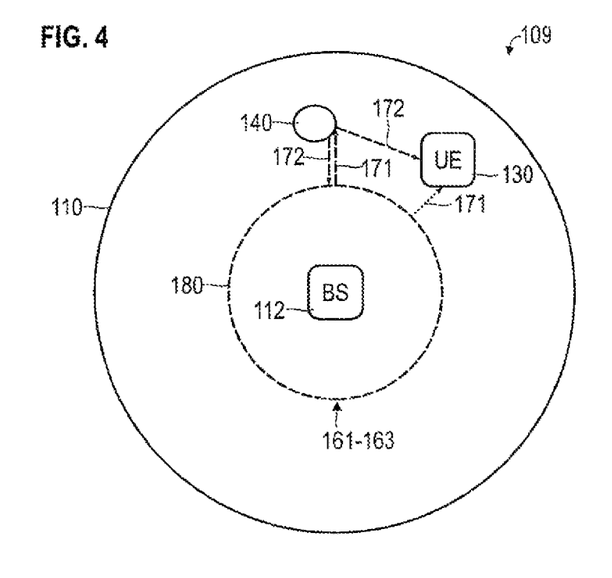
FIG. 4 schematically illustrates devices connected to a cellular network participating in a radar probing according to various embodiments.

FIG. 4 schematically illustrates an example of the radar probing 109. Here, the BS 112 is the radar transmitter. The BS 112 thus transmits radar probe pulses. The BS 112 implements a cell 110 of the cellular network. The cell 110 extends around the BS 112.

The radar probe pulses 171, in the example of FIG. 4, have isotropic directional transmission profiles 180, i.e., have substantially the same amplitude for various orientations of transmission with respect to the BS 112 (schematically illustrated by the dashed circle in FIG. 4). Thus, an amplitude or phase of the radar probe pulses does not show a significant dependency on the transmission direction.

The radar probe pulses 171 can travel along a LOS direction from the BS 112 to the terminal 130 (dotted arrow in FIG. 4). The radar probe pulses 171 are also reflected by a passive object 140, e.g., an obstacle, a car, a plant, a house, a car, a person, etc. The passive object 140 is not required to have communication capability. Thus, the passive objection 140 may not be configured to communicate on the radio channel 101, 105, 106. Due to the reflection at the passive object 140, echoes 172 of the radar probe pulses 171 are created. These echoes 172 may be received by the terminal 130 and/or the BS 112, as indicated in FIG. 4 by the respective arrows.

In some examples, a direction of the echoes 172 and/or a phase shift of the echoes 172 may be characteristic of the position or shape of the object 140. A Doppler shift of the echoes 172 may be characteristic of the velocity of the object 140.

Figure 5A:
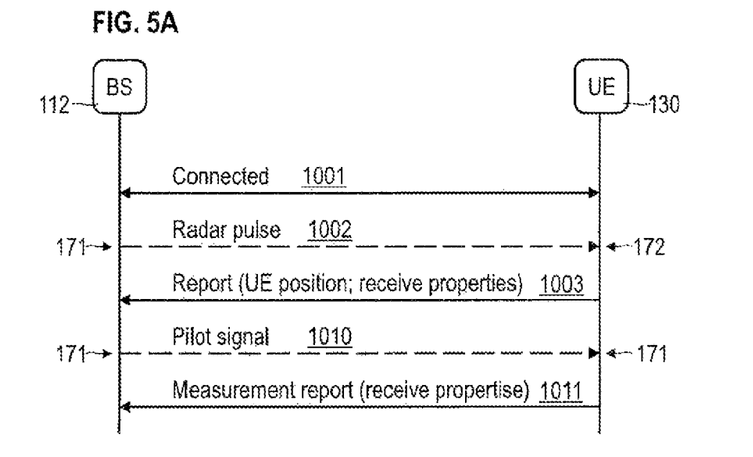
FIG. 5A is a signaling diagram for devices connected to a cellular network participating in a radar probing according to various embodiments.

FIG. 5A is a signaling diagram of communication between the BS 112 and the terminal 130. The communication illustrated in the example of FIG. 5A facilitates the radar probing 109.

First, at 1001, the radio channel 101 is established between the BS 112 and the terminal 130. Here, an attachment procedure can be executed. Subsequently, the terminal 130 may be operated in connected mode.

Typically during the attachment procedure, the particular resource mapping 155 to be used—including the position of the resource elements 161-163 used for transmission of the pilot signals, as well as the position of the transmission blocks 160—is negotiated between the BS 112 and the terminal 130. E.g., this can be implemented by transmitting the cell identifier of the cell to which the terminal 130 is connected to the terminal 130. The cell identifier can be uniquely associated with a given resource mapping 155 to be used.

Then, at 1002, transmission of the radar probe pulse 171 is effected. In the example of FIG. 5A, the BS 112 transmits the radar probe pulse 171. The radar probe pulse 171 is implemented by a pilot signal. In the example of FIG. 5A, an echo 172 of the radar probe pulse 171 is received by the terminal 130.

In the example of FIG. 5A, the terminal 130 evaluates the reception of the radar probe pulse 171 to some degree. In detail, the terminal analyzes the raw receive data and determines certain receive properties of the echo 172, e.g.: angle of arrival; time-of-flight; Doppler shift;

and/or receive power level. Thus, the terminal 130 is configured to determine the one or more receive properties based on the received echoes 172.

The terminal then sends a report message 1003 to the BS 112. The report message is indicative of the determined one or more receive properties of the echo 172. Optionally, the report message 1003 is indicative of a relative or absolute position of the terminal 130. Based on the one or more receive properties—and optionally further based on the position of the terminal 130 as obtained from the report message 1003, if not otherwise known to the BS 112—, the BS 112 may then use this information to determine the position and/or velocity of the passive object associated with the echo 172. In detail, where the absolute or relative position of the terminal 130—e.g., with respect to the BS 112—is known, it is possible to conclude back on the position of the passive object, e.g., by means of triangulation, etc. Similar considerations apply with respect to the direction of movement of the passive object 140.

Also illustrated in FIG. 5A is a scenario where the terminal 130 receives the radar probe pulse 171 in a LOS transmission, 1010. I.e., the terminal 130 does not (necessarily) receive an echo of the radar probe pulse 171 at 1010, but receives the non-reflected radar probe pulse 171. Because the radar probe pulse 171 is implemented by a pilot signal, it is possible to perform channel sensing and/or link adaptation based on the respective pilot signal. For this, the terminal 130 sends a measurement report 1011 indicative of at least one receive property of the pilot signal back to the BS 112. The BS 112 can then perform channel sensing and/or link adaptation based on the indicated at least one receive property.

Channel sensing and/or link adaptation can also be performed based on UL pilot signals/radar probe pulses 171. Further, channel sensing and/or link adaptation can also be performed based on at least one receive property of an echo 172 of a pilot signal.

E.g., in one example, it is possible that the echo 172 of the radar probe pulse 171 received at 1002 corresponds to pilot signal associated with a neighboring cell of the cell 110 to which the terminal 130 is connected to. This may be the reason why channel sensing and/or link adaptation is not implemented based on the receive properties of the transmission at 1002. However, the pilot signal implementing the radar probe pulse 171 received at 1010 may be associated with the cell 110 to which the terminal 130 is connected to. Because of this, channel sensing and/or link adaptation can be implemented based on the receive properties of the transmission at 1010. Whether or not a pilot signal is associated with the respective cell 110 may be derived from a cell identifier included in the respective pilot signal and/or based on knowledge on the respective resource mappings 155. In particular, pilot signals associated with different cells 110 may be orthogonal with respect to each other, e.g., my be transmitted in resource elements 161-163 which are orthogonal in time domain, frequency domain, code domain, etc. Therefrom, it is possible to conclude back on the particular cell 110 to which a given pilot signal belongs to. Such examples as described above with respect to the physical cell 110 may also be implemented for virtual cells.

Figure 5B:
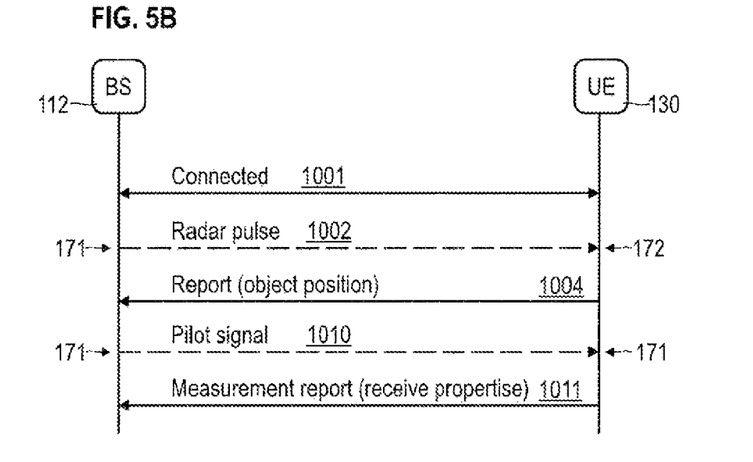
FIG. 5B is a signaling diagram for devices connected to a cellular network participating in a radar probing according to various embodiments.

FIG. 5B is a signaling diagram of communication between the BS 112 and the terminal 130. The example of FIG. 5B generally corresponds to the example of FIG. 5A. However, in the example of FIG. 5B, further processing as part of the radar probing 109 is performed at the terminal 130. In particular, the terminal 130 already evaluates one or more receive properties of the echo 172 to determine the relative or absolute position of the object 140. This position and/or velocity is included in the report message 1004. Then, the BS 112 may receive the report message 1004. The BS 112, in some examples, may fuse respective information, e.g., on the position and the velocity, received from a plurality of terminals. Here, also the position and/or the velocity as determined from an echo 172 received by the BS 112 itself may be taken into consideration. This may increase an accuracy of the radar probing 109.

In the various examples, the amount of logic residing at the terminal 130—and, generally, the radar receiver—may vary. In one example, raw information on the received echo 172 is reported to the radar transmitter—e.g., the BS 112. In other examples, some processing of the raw information is performed, e.g., as in the example of FIG. 5A, to determine one or more receive properties and/or to compress the raw information. In other examples, it is even possible to determine the position of the object 140 from which the echo 172 originates. Then, this position can be reported to the radar transmitter—e.g., the BS 112.

While above various examples have been described with respect to radar probe pulses 171 having an isotropic directional transmission profile 180, it is also possible that the radar probe pulses 171 have an anisotropic directional transmission profiles.

Figure 6:
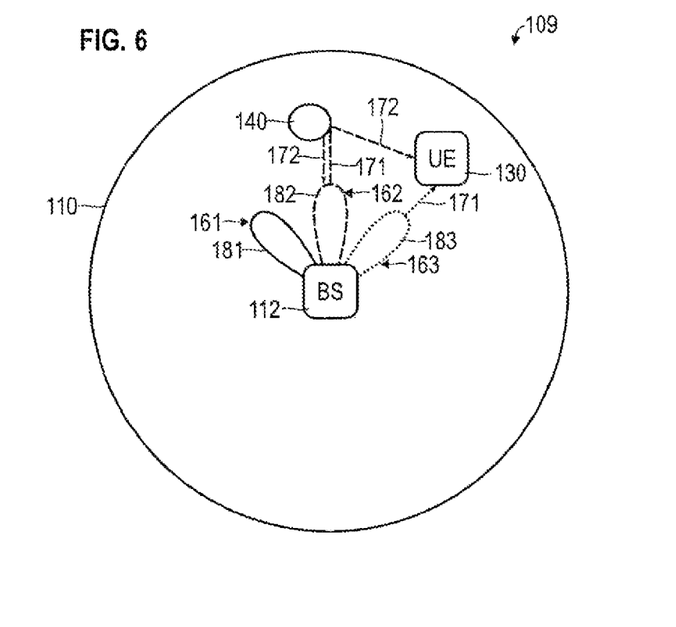
FIG. 6 schematically illustrates devices connected to a cellular network participating in a radar probing according to various embodiments, wherein the corresponding radar probe pulses have anisotropic directional transmission profiles.

FIG. 6 schematically illustrates an example of radar probing 109 where the employed radar probe pulses 171 have anisotropic directional transmission profiles 181-183. The anisotropic directional transmission profiles 181-183 are associated with a dependency of the amplitude of the respective radar probe pulses 171 with respect to an orientation against the radar transmitter, in the example of FIG. 6 with respect to the BS 112. In the example of FIG. 6, the anisotropic direction transmission profiles 181-183 are implemented by corresponding pencil beams, but generally other shapes are conceivable. The anisotropic directional transmission profiles 181-183 may be employed based on techniques of beamforming. For beamforming, amplitude and phase of antennas of an antenna array are varied according to certain antenna weights. The antenna weights are typically determined based on techniques of channel sensing, i.e., depending on receive properties of pilot signals. Thereby, constructive and destructive interference may be achieved for different directions with respect to the transmitter. This results in the anisotropic direction transmission profile 181-183.

As illustrated in FIG. 6, a plurality of different anisotropic directional transmission profiles 182 is implemented for different radar probe pulses 171. In particular, the different anisotropic directional transmission profiles 181-183 are associated with different radar probe pulses 171. Thus, different ones of the radar probe pulses 171 may have different anisotropic directional transmission profiles. Thereby, it is possible to obtain a high spatial resolution for the radar probing 109.

While in the example of FIG. 6, only three anisotropic directional transmission profiles 181-183 are illustrated for sake of simplicity, in general, a plurality of anisotropic directional transmission profiles 181-183 may be employed, e.g., to cover the entire surrounding of the radar transmitter.

In the example FIG. 6, the anisotropic directional transmission profiles 182 are implemented as pencil beams. By implementing well-defined or narrow anisotropic directional transmission profiles 181-183, e.g., in the form of pencil beams as illustrated in FIG. 6, a high spatial resolution of the radar probing 109 can be achieved. This is apparent from FIG. 6 where the radar probe pulse 171 of the profile 182 is reflected by the passive object 140; the respective echoes 172 are being received by, both, the BS 112, as well as the terminal 130. On the other hand, the radar probe pulse 171 of the profile 183 is not reflected by the passive object 140, because it is positioned outside the profile 183.

Figure 7:
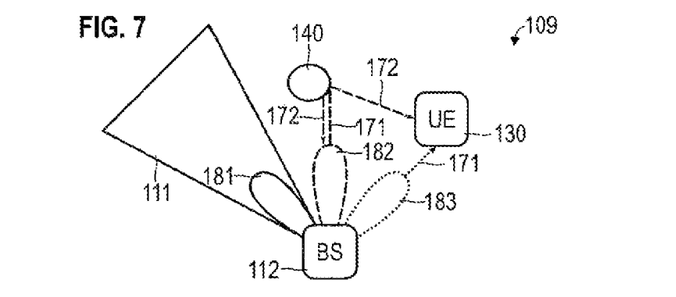
FIG. 7 schematically illustrates devices connected to a cellular network participating in a radar probing according to various embodiments, wherein the corresponding radar probe pulses have anisotropic directional transmission profiles and wherein the anisotropic directional transmission profiles correspond to virtual cells of the cellular network.

FIG. 7 schematically illustrates an example of radar probing 109 where the employed radar probe pulses 171 have anisotropic directional transmission profiles 181-183. FIG. 7 generally corresponds to the example of FIG. 6. However, in the example of FIG. 7, the different anisotropic directional transmission profiles 181-183 are associated with different virtual cells 111 of the BS 112 (in FIG. 7 only the virtual cell 111 associated with the anisotropic directional transmission profile 181 is illustrated for sake of simplicity; the terminal 130 is connected to the virtual cell 111 associated with the anisotropic direction transmission profile 183).

The various virtual cells 111 may be associated with different cell identifiers and may, hence, employ different resource mappings 155 in some examples. Pilot signals communicated in the different virtual cells 111 may be orthogonal to each other. The virtual cells 111 may facilitate spatial orthogonality of the data communication 108. In some examples, it is possible that the virtual cells 111 are associated with one or more than one BS (not shown in FIG. 7). The concept of virtual cells 111 may be associated with the comparably small aperture of high-frequency electromagnetic waves, e.g., above 6 or 30 GHz. To implement different virtual cells 111, the BS 112 may have duplex capability. Here, full duplex (FD) or half duplex (HD) scenarios may be implemented. Respective considerations may also apply to the terminal 130.

As illustrated in FIG. 7, the terminal 130—connected to the virtual cell 111 associated with the anisotropic directional transmission profile 183—also receives an echo 172 of the radar probe pulse 171 implemented by a pilot signal of the virtual cell 111 associated with the anisotropic directional transmission profile 182, i.e., an echo of a pilot signal of a neighboring cell.

By associating the different virtual cells 111 with the different radar probe pulses 171, the concept of spatial diversity implemented by the BS 112 can be re-used to provide a high spatial resolution for the radar probing 109. I.e., where different virtual cells 111 are associated with the anisotropic directional transmission profiles 181-183, anyway, the respective pilot signals can be efficiently re-used as radar probe pulses 171.

E.g., based on the at least one receive property of the echo 172 pilot signal/the radar probe signal 171, it is possible to initiate a handover between neighboring virtual cells 111. In an example where the terminal 130 receives a strong echo 172 or signal along the direct path of the pilot signal associated with the virtual cell 111 defined by the anisotropic direction transmission profile 182, this can be used to trigger the handover to that virtual cell 111.

In some examples, it is also possible to consider results from the radar probing 109 in triggering the handover between different cells 110, 111 of the cellular network. E.g., it would be possible to consider the position and/or velocity of the object 140 in the handover. E.g., if significant obstruction of the LOS transmission path is expected to result from the object 140 changing its position with respect to the terminal 130, this can be taken into account when triggering the handover.

Figure 8:
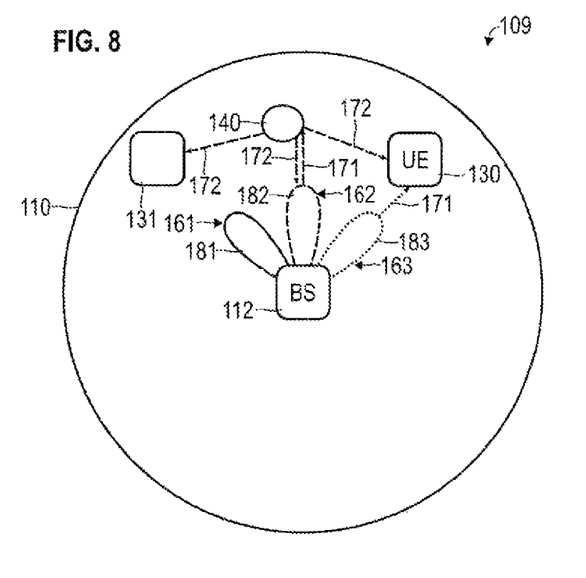
FIG. 8 schematically illustrates devices connected to a cellular network participating in a radar probing according to various embodiments, wherein the radar probe pulses have anisotropic directional transmission profiles.

FIG. 8 schematically illustrates an example of the radar probing 109 where the employed radar probe pulses 171 have anisotropic directional transmission profiles 181-183. Here, more than two devices—in the example of FIG. 8, the terminals 130, 131 and the BS 112—may participate in the radar probing 109. In the present example, the BS 112 is the radar transmitter. It is possible that the BS 112 fuses information received from the terminals 130, 131 when determining the position and the velocity of the object 140. For this, the BS 112 may receive report messages 1003, 1004 from each one of the terminals 130, 131. Additionally, the BS 112 may take into consideration the echo 172 directly received by the BS 112 when determining the position at the velocity of the object 140. By taking into account a plurality of sources of information regarding the radar probing 109, the accuracy in determining the position and the velocity of the object 140 as part of the radar probing 109 can be increased.

Figure 9:
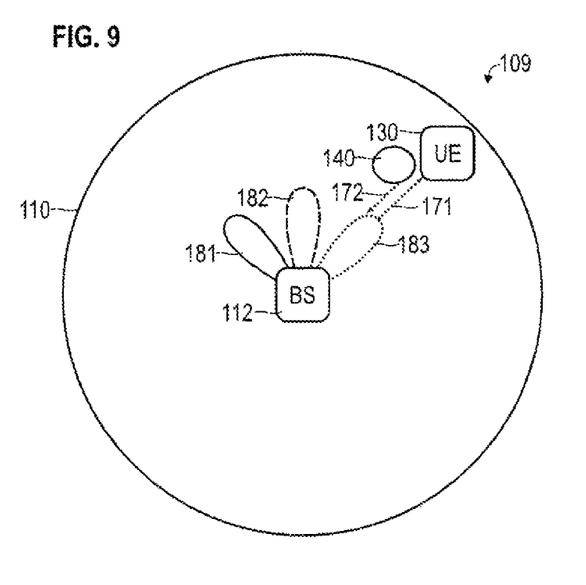
FIG. 9 schematically illustrates devices connected to a cellular network participating in a radar probing according to various embodiments, wherein the radar probe pulses have anisotropic directional transmission profiles.

FIG. 9 schematically illustrates an example of the radar probing 109 where the employed radar probe pulses 171 have anisotropic directional transmission profiles 181-183. In the example of FIG. 9, it is illustrated that the radar probe pulse 171 may be received by the terminal 130 in a LOS transmission; while the respective echo 172 is reflected back to the BS 112 (and optionally also to the terminal 130; not illustrated in FIG. 9). Here, it is possible that the LOS transmission of the pilot signal implementing the radar probe pulse 171 is used for channel sensing and/or link adaptation. The reflection of the echo 172 can be used as part of the radar probing 109. As can be seen, one and the same waveform can be re-used as a pilot signal on the one hand side and a radar probe pulse on the other hand side.

Figure 10:
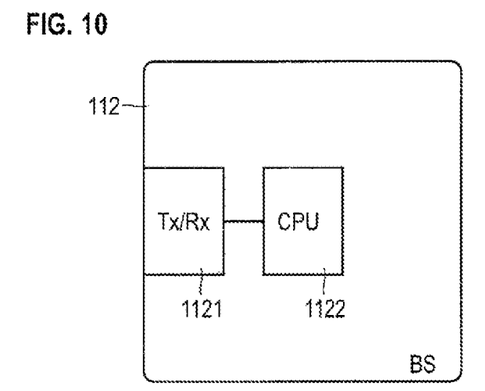
FIG. 10 is a schematic illustration of a base station of a cellular network configured to implement techniques of coexistence of data communication and radar probing according to various embodiments.

FIG. 10 is a schematic illustration of the BS 112. The BS comprises a processor 1122, e.g., a multicore processor. The BS 112 further comprises a radio transceiver 1121. The radio transceiver 1121 is configured to communicate on the radio channel 101, e.g., by transmitting and receiving (transceiving). Furthermore, the radio transceiver 1121 is configured to transmit and/or receive radar probe pulses 171. The processor 1122 can be configured to perform techniques as described herein with respect to coexistence of data transmission 108 and radar probing 109. For this, a non-volatile memory may be provided which stores respective control instructions.

Figure 11:
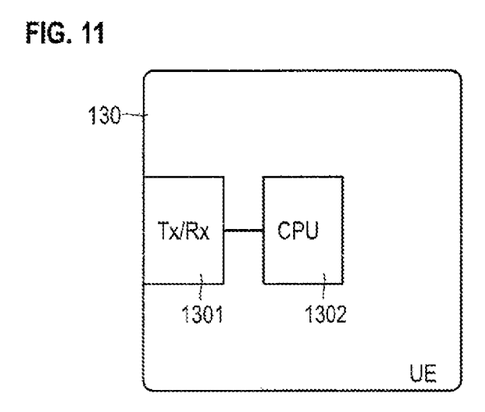
FIG. 11 is a schematic illustration of a terminal of a cellular network configured to implement techniques of coexistence of data communication and radar probing according to various embodiments.

FIG. 11 is a schematic illustration of the terminal 130. The terminal 130 comprises a processor 1302, e.g., a multicore processor. The terminal 130 further comprises a radio transceiver 1301. The radio transceiver 1301 is configured to communicate on the radio channel 101, e.g., by transceiving. Furthermore, the radio transceiver 1301 is configured to transmit and/or receive radar probe pulses 171. The processor 1302 can be configured to perform techniques as described herein with respect to coexistence of data transmission 108 and radar probing 109. For this, a non-volatile memory may be provided which stores respective control instructions.

Figure 12:
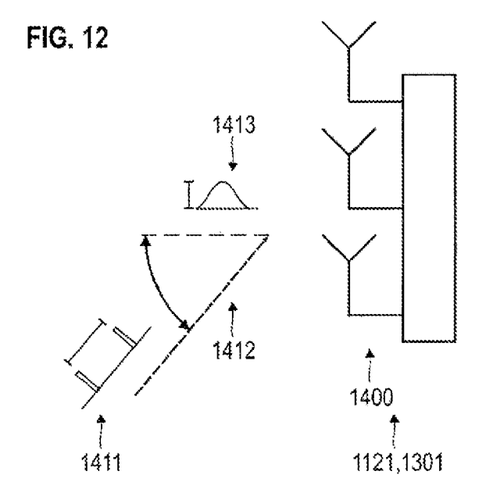
FIG. 12 schematically illustrates receive properties of radar probe pulses received by an antenna array of a radio transceiver according to various embodiments.

FIG. 12 schematically illustrates the transceivers 1121, 1301 in greater detail. The transceivers 1121, 1301 comprise an antenna array 1400 in the illustrated example. The antenna array 1400 may support multiple input multiple output (MIMO) scenarios. Based on the antenna array 1400, it is possible to employ an anisotropic sensitivity profile during reception, e.g., of an echo 172 of a radar probe pulse 171. E.g., in some examples, it is possible that the accuracy of the radar probing 109 is further increased by employing an anisotropic sensitivity profile of the antenna array 1400 of the radio transceiver 1121, 1301. Such anisotropic sensitivity profile of the antenna array 1400 may be combined with an isotropic directional transmission profile 180 or and anisotropic directional transmission profile 181-183 of the respective radar probe pulse 171.

The example of FIG. 12, the transceivers 1121, 1301 comprise a single antenna array 1400. In further examples, it is possible that the transceivers 1121, 1301 comprise a plurality of antenna arrays 1400. The plurality of antenna arrays 1400 may be oriented differently to cover different directions with respect to the respective device. Omnidirectional coverage can be provided.

FIG. 12 furthermore schematically illustrates receive properties such as the receive power level 1413; the angle of arrival 1412; and the time-of-flight 1411. Further receive properties of interest regarding the radar probing 109 include the Doppler shift which may be used in order to determine a velocity of the object 140, e.g., in radial direction. E.g., the angle of arrival 1412 may be determined in absolute terms, e.g., with respect to a magnetic North direction provided by a separate compass and gravity meter for elevation (not illustrated in FIG. 12), etc. It is also possible that the angle of arrival 1412 is determined in relative terms, e.g., with respect to a characteristic direction of the antenna array 1400. Depending on the definition of the angle of arrival 1412 and/or the further receive properties, corresponding information may be included in a respective report message 1003. A further receive property is the phase shift, e.g., with respect to an arbitrary reference phase such as the phase of non-reflected radar probe pulse, etc.

Figure 13:
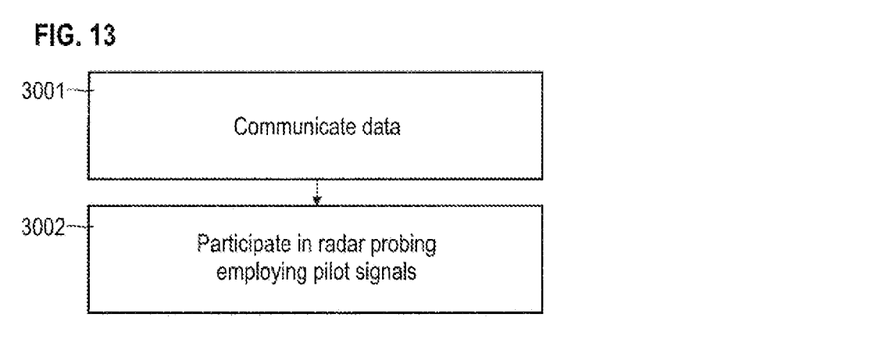
FIG. 13 is a flowchart of a method according to various embodiments.

FIG. 13 is a flowchart of a method according to various embodiments. E.g., the method of FIG. 13 may be executed by the processor 1122 of the BS 112 and/or by the processor 1302 of the terminal 130.

First, at 3001, data communication 108 is executed. For this, packetized data may be transmitted and/or received on the radio channel 111 in the transmission blocks 160. Typically, the data communication 108 is implemented based on LOS signal propagation.

Figure 14:
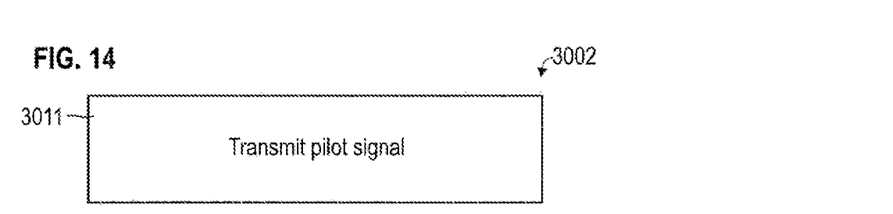
FIG. 14 is a flowchart of a method according to various embodiments.
Figure 15:
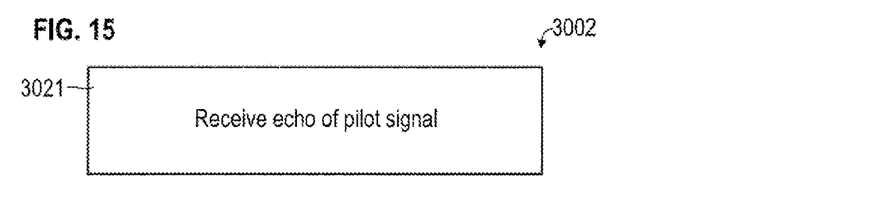
FIG. 15 is a flowchart of a method according to various embodiments.

Second, at 3002, participation in the radar probing 109 is executed. In the depicted example, the radar probing 109 is implemented based on the transmission of pilot signals. In detail, the pilot signals are re-used as radar probe pulses 171. Typically, the radar probing 109 is executed based on non-LOS signal propagation, i.e., based on echoes. 3002 may comprise one or more of the following: transmitting a radar probe pulse 171 (cf. FIG. 14: 3011); receiving an echo 172 of a radar probe pulse 171 (cf. FIG. 15: 3021); determining at least one of a position in the velocity of a passive object based on at least one receive property 1411-1413 of the radar probe pulse 171; determining the at least one receive property 1411-1413 from an a received echo 172; receiving a control message 1003 indicating at least one of the at least one receive property 1411-1413, a position, and a velocity of a radar receiver.

Summarizing, above techniques have been illustrated which enable to use reflection of pilot signals to implement radar probing. Radar probing can allow to determine the position and/or the velocity of passive objects by echoes of the pilot signals.

These techniques are based on the finding that properties of the electromagnetic waves at higher frequencies are more contained. E.g., transmission of high-frequency electromagnetic waves may be associated with comaprably narrow anisotropic directional transmission profiles. This may be used to obtain radar pictures by the radar probing having a high spatial resolution. The radar probing may comprise determining one or more receive properties of echoes such as power level, delay profiles, angle of arrival, Doppler shift, phase shift, etc.

In some examples, the radar probe pulses implemented by the pilot signals are transmitted into well-defined directions. For this, anisotropic directional transmission profiles are employed. E.g., pencil beams having an opening angle of less than 90°, preferably less than 45°, more preferably of less than 20° may be employed. Then, it is possible that the radar transmitter also implements reception of echoes of the radar probe pulses. E.g., the same antenna array used for transmitting the radar probe pulses can be used to receive echoes of the radar probe pulses. I.e., the radar transmitter and the radar receiver may be co-located.

In some examples, the radar transmitter may be implemented by a first device and the radar receiver may be implemented by a different, second device. Generally, it is possible that multiple distributed antenna arrays are used for receiving echoes of the radar probe pulses. In such examples, report messages may be communicated between the first and second devices. Depending on the particular implementation, the information content included in such report messages may vary: in one example, the radar receiver may report back raw data of the received echo. In other examples, the radar receiver may perform some post-processing to obtain, e.g., receive property such as the angle of arrival, power level, etc.; or even determine the position and/or velocity of the passive object from which the echo originates.

In some examples, the above-identified anisotropic directional transmission profiles can be implemented for pilot signals transmitted by the base station into different beam angles associated with different virtual cells. Here, the pilot signals of each virtual cell can be orthogonal to pilot signals of other virtual cells. The pilot signals can be received by one or more terminals and can be used for channel sensing and/or link adaptation. E.g., antenna weights of an antenna array can be determined based on one or more receive properties of the pilot signals. In addition to such usage of the pilot signals for channel sensing and/or link adaptation, it is also possible that the terminal determines one or more receive properties for available reflections/echoes of the pilot signals. Here, optionally, also echoes of the pilot signals from neighbor virtual cells can be taken into account.

Although the invention has been shown and described with respect to certain preferred examples, equivalents and modifications will occur to others skilled in the art upon the reading and understanding of the specification. The present invention includes all such equivalents and modifications and is limited only by the scope of the appended claims.

E.g., while above various examples have been described with respect to radar probe pulses transmitted by the BS, respective techniques may be readily implemented with respect to radar probe pulses transmitted by the terminal. E.g., in some examples device-to-device or vehicle-to-vehicle scenarios may be combined with radar probing. Here, it is not required that the BS is involved as radar transmitter and/or radar receiver.

The invention claimed is:

1. A device, comprising:
a radio transceiver comprising at least one antenna array configured to support multiple input multiple output (MIMO) communication for both data communication and a radar probing,
at least one processor configured to communicate, via the radio transceiver, data on a radio channel according to a radio access technology, the radio access technology comprising pilot signals and transmission blocks for the data,
wherein the at least one processor is configured to control the radio transceiver to participate in the radar probing employing at least some of the pilot signals as radar probe pulses of the radar probing, the radar probing being based on one or more receive properties of echoes of the radar probe pulses, and wherein the at least one processor is further configured to employ one or more resource mappings to coordinate resource-usage of transmissions of the data communication and transmissions of the radar probing that are both transmitted from the radio transceiver such that data communication transmissions and radar probing transmissions use different resources while being transmitted from the radio transceiver, and
wherein the at least one antenna array comprises a first antenna configured to transmit the radar probe pulses and a second antenna configured to receive the echoes of the radar probe pulses.

2. The device of claim 1,
wherein at least some of the radar probe pulses have anisotropic directional transmission profiles.

3. The device of claim 2,
wherein different ones of the at least some of the radar probe pulses have different anisotropic directional transmission profiles.

4. The device of claim 3,
wherein the radio access technology supports handovers between multiple cells of a cellular network,
wherein different anisotropic directional transmission profiles are associated with different virtual cells.

5. The device of claim 2,
wherein the at least some of the radar probe pulses are indicative of their respective anisotropic transmission profile.

6. The device of claim 1,
wherein the radar probe pulses are indicative of a respective time of transmission.

7. The device of claim 1,
wherein different ones of the radar probe pulses are orthogonal with respect to each other.

8. The device of claim 1,
wherein the at least one processor is configured to control the radio transceiver to transmit the radar probe pulses.

9. The device of claim 1,
wherein the at least one processor is configured to control the radio transceiver to receive echoes of the radar probe pulses reflected from passive objects.

10. The device of claim 9,
wherein the at least one processor is configured to control the radio transceiver to receive the echoes of the radar probe pulses employing an anisotropic sensitivity profile of the at least one antenna array of the radio transceiver.

11. The device of claim 1,
wherein the at least one processor is configured to determine at least one of a position and a velocity of a passive object based on at least one receive property of echoes of the radar probe pulses as part of the radar probing.

12. The device of claim 9,
wherein the at least one processor is configured to determine at least one of a position and a velocity of a passive object based on at least one receive property of echoes of the radar probe pulses as part of the radar probing; and
wherein the at least one processor is configured to determine the at least one receive property based on the echoes received by the radio transceiver.

13. The device of claim 11,
wherein the at least one processor is configured to receive, from at least one further device communicating on the radio channel according to the radio access technology, at least one control message indicative of the at least one receive property of the echoes,
wherein the at least one processor is configured to determine the at least one receive property based on the at least one control message.

14. The device of claim 13,
wherein the at least control message is further indicative of a relative or absolute position of the at least one further device,
wherein the at least one processor is configured to determine the at least one of the position and the velocity of the passive object further based on the position of the at least one further device.

15. The device of claim 11,
wherein the at least one receive property is selected from the group comprising: relative or absolute angle of arrival; time of flight; Doppler shift; phase shift; and receive power level.

16. The device of claim 11,
wherein the at least one processor is configured to initiate a handover between multiple cells based on the at least one receive property.

17. The device of claim 1,
wherein the at least one processor is configured to receive, from at least one further device communicating on the radio channel according to the radio access technology, at least one control message indicative of at least one of a position and a velocity of a passive object determined based on the radar probing.

18. The device of claim 1,
wherein the at least one processor is configured to perform at least one of channel sensing of the radio channel and link adaptation of the radio channel based on at least one receive property of the radar probe pulses.

19. The device of claim 1,
wherein the device is a base station of a cellular network comprising the radio channel, or
wherein the device is a terminal of a cellular network.

20. A method, comprising:
communicating data on a radio channel, by way of a radio transceiver comprising at least one antenna array configured to support multiple input multiple output (MIMO) communication for both data communication and a radar probing, according to a radio access technology comprising pilot signals and transmission blocks for the data,
participating in the radar probing employing at least some of the pilot signals as radar probe pulses of the radar probing, the radar probing being based on one or more receive properties of echoes of the radar probe pulses,
wherein one or more resource mappings are employed to coordinate resource-usage of transmissions of the data communication and transmissions of the radar probing that are both transmitted from the radio transceiver such that data communication transmissions and radar probing transmissions use different resources while being transmitted from the radio transceiver, and
wherein the at least one antenna array comprises a first antenna configured to transmit the radar probe pulses and a second antenna configured to receive the echoes of the radar probe pulses.

* * * * *